Dec. 9, 1958
A. G. FOSTER
2,863,169
EXTRUDING DIES
Filed April 4, 1956
2 Sheets-Sheet 1
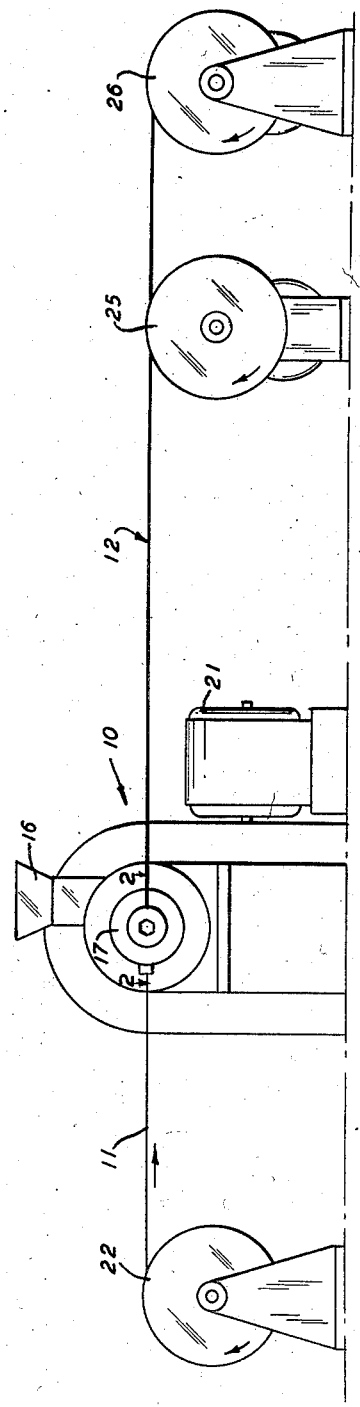
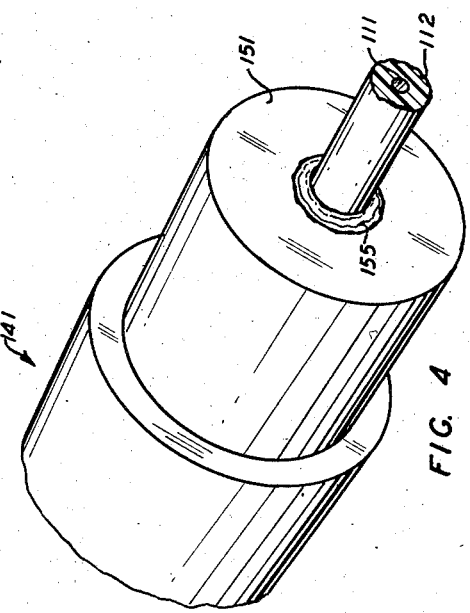
INVENTOR.
A. G. FOSTER
BY
ATTORNEY Dec. 9, 1958  A. G. FOSTER  2,863,169
EXTRUDING DIES
Filed April 4, 1956  2 Sheets-Sheet 2

INVENTOR.
A. G. FOSTER
BY
ATTORNEY

United States Patent Office 2,863,169
Patented Dec. 9, 1958

2,863,169

EXTRUDING DIES

Arthur G. Foster, Towson, Md., assignor to Western Electric Company, Incorporated, New York, N. Y., a corporation of New York Application April 4, 1956, Serial No. 576,015

5 Claims. (Cl. 18—12)

This invention relates to extruding dies, and more particularly to extruding dies for forming plastic material around a continuously-advancing conductor.

In the manufacture of certain types of insulated conductors for use in communication devices, an insulating covering of a plastic material, such as polyethylene, is extruded around the conductor by means of an extrusion machine. Such a machine is provided with a die through which the conductor advances, and the die shapes the plastic material into a covering around the advancing conductor.

In the past, extruding dies have been generally cylindrical in shape with a circular bore formed through the center thereof. With such ordinary dies, there is a tendency for some of the plastic material being extruded therethrough to adhere to the die at the exit end thereof from which the material emerges. It is believed that the depositing of some of the plastic material on the die is caused by the sudden release of pressure on the plastic material as it emerges from the die into the atmosphere.

The material so deposited on the die usually builds up into a large, toroidal-shaped mass which eventually breaks loose from the die, completely encircles the insulating covering formed around the conductor and adheres tenaciously to the covering. This effect is termed "drooling" in the extrusion art, and the ring of plastic material which is deposited on an insulated covering is called "drool." This drool is manifestly undesirable because it diminishes the quality of the extruded covering and also may cause damage to apparatus that perform further operations on the insulated conductor.

An object of the invention is to provide new and improved extruding dies.

Another object of the invention is to provide new and improved extruding dies for forming plastic material around a continuously-advancing conductor.

A further object of the invention is to provide new and improved extruding dies for shaping a covering of plastic material around a conductor and for preventing any of the plastic material from adhering to the die in such a way that it will be deposited on the covered conductor, adhere tenaciously thereto and form imperfections thereon.

An extruding die, illustrating certain features of the invention, may have a bore formed therethrough designed to form plastic material into an article, a curved outer face at the exit end thereof which intersects the bore at an acute angle, and a flat surface formed in the curved face so that a point is formed at each intersection of the flat surface, the curved face and the bore.

More specifically, this invention provides an extruding die for forming plastic material around a continuously-advancing conductor and for preventing the plastic material from adhering to the die in such a way that it will be deposited on the covered conductor and form imperfections thereon. Such a die may include a cylindrical body member which has a frustoconical face formed at the end of the die from which the conductor emerges. The die is provided with a central bore and the frustoconical face intersects the bore at the exit end of the die so that a sharp edge is formed at the intersection.

Because of this sharp edge, any plastic material that adheres to the die will be deposited on an area of the die away from the covering of material being applied to the conductor. A ring of the plastic material that is deposited on the die may still be pulled onto the covering around the conductor, but it will not adhere tenaciously thereto and can be removed easily. To aid in breaking up the ring of plastic material deposited on the die, a plurality of flat surfaces may be formed in the frustoconical face substantially parallel to that face so that a plurality of points are formed at the exit end of the die. Any material deposited will then adhere to the points and, when it is pulled from the points, it will fall harmlessly from the covered conductor.

A complete understanding of the invention may be obtained from the following detailed description of apparatus forming a specific embodiment thereof, when read in conjunction with the appended drawings, in which:

Fig. 1 is a side elevation of apparatus embodying the invention;

Fig. 4 is an enlarged, fragmentary, perspective view of a die of a type that is commonly used in the extruding art.

Figure 2:
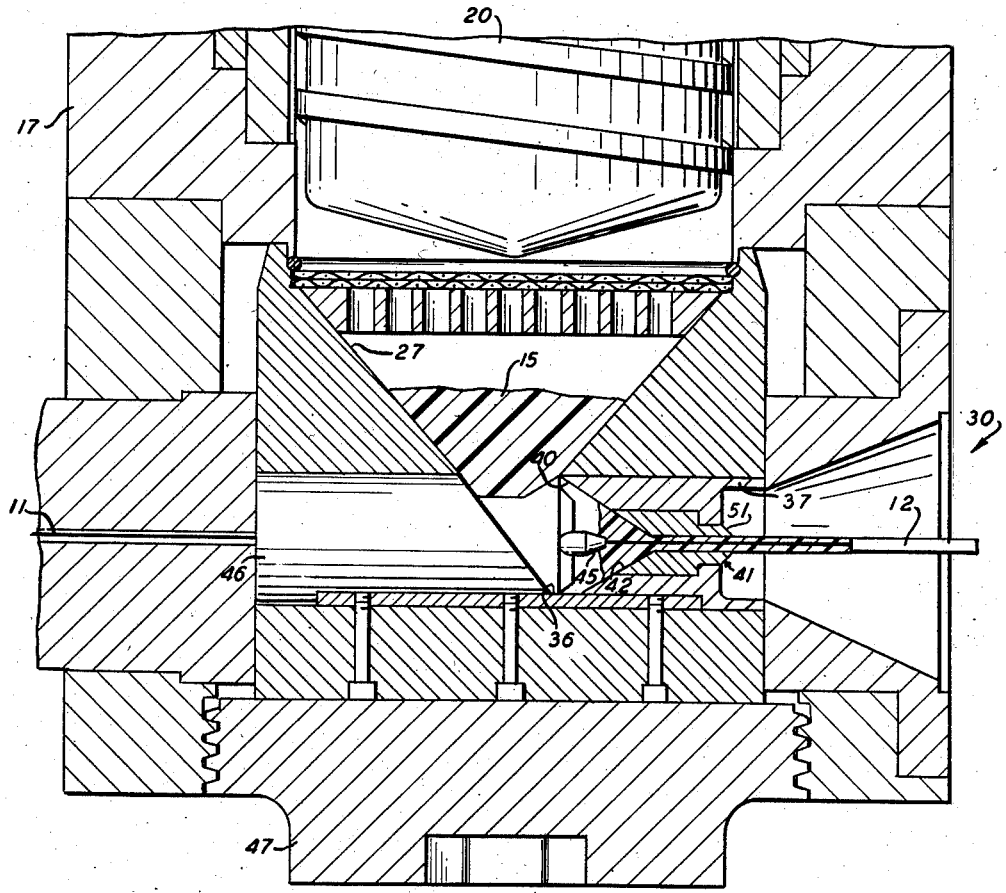
Fig. 2 is an enlarged, fragmentary, horizontal section taken along line 2—2 of Fig. 1.

Referring now in detail to the drawings, and more particularly to Figs. 1 and 2, an extruder, designated generally at 10, is provided to extrude plastic material onto a bare, filamentary electrical conductor 11 to form an insulated covering 12 therearound. A suitable plastic material 15, such as granular polyethylene, is placed in a hopper 16 and from there it flows to an extrusion cylinder 17. A stock screw 20 (Fig. 2), which is rotated by a motor 21, is positioned within the extrusion cylinder 17. The stock screw 20 works the material 15 and impels it along the cylinder 17. The conductor 11 is advanced to the extruder 10 from a supply stand 22 and is pulled therethrough by a capstan 25. The insulated conductor passes around the capstan 25 and finally is wound on a takeup reel 26.

Referring to Fig. 2, the plastic material 15 is forced by the stock screw 20 along the extrusion cylinder 17 and into a tapered passageway 27 formed within an extruding head 30 secured suitably to the extrusion cylinder 17. The plastic material 15 is forced by the stock screw 20 through the tapered passageway 27 and into an extrusion passage 36 formed in the extruding head 30 and positioned at right angles to the axis of the extrusion cylinder 17.

Positioned within the extrusion passage 36 is a die holder 37, which is provided with a bore 40 a portion of which is frustoconical in shape and formed at a predetermined angle with respect to the longitudinal axis of the die holder 37. A forming die 41, embodying the invention, is inserted within the die holder 37 and is provided with a bore 42, a portion of which is also frustoconical in shape and forms an extension of the frustoconical portion of the bore 40 in the die holder 37. The conductor 11 is directed towards the bore 42 within the die 41 by a core tube 45, secured suitably within a core tube holder 46. The various tools described hereinabove are secured within the extruding head 30 by a binder nut 47.

A die 141, which has been used heretofore in the extruding art and which may be inserted within the die holder 37, is shown in Fig. 4. The die 141 includes a flat face 151 that is perpendicular to the axis of a bore formed centrally and longitudinally of the die. A conductor 111 is advanced through the bore and has a covering 112 applied continuously therearound. As the conductor 111 passes through the die 141, there is a tendency for some of the plastic insulating material to adhere to the face 151 of the die 141 in the form of globules instead of being applied around the conductor 111 as part of the covering 112. Such globules steadily increase in size and may finally be formed into a toroidal-shaped mass 155. The fact that the plastic material is under great pressure in the die 141 and is under substantially no pressure when it emerges from the die into the atmosphere is believed to be the reason for the formation of the toroidal-shaped mass 155.

As the mass 155 of plastic material increases in size, the plastic covering 112 being applied to the conductor 111 exerts a force thereon that tends to pull it onto the insulated covering 112. Finally, the mass 155 breaks away from the die 141 and completely encircles and adheres tenaciously to the insulated covering 112 to form a mass of drool thereon. Obviously, the presence of masses of drool at intervals on the finished insulated conductor is deleterious. Also, such irregularities may cause damage in apparatus used to perform subsequent operations on the covered conductor 111. Dies such as the die 41 embodying the invention eliminate the effect of drooling and, hence, result in both a more perfect extruded article and the prevention of damage to apparatus that perform subsequent operations on the extruded article.

The die 41 is provided with a frustoconical face 51 formed, by grinding for example, at the exit end of the die from which the conductor 11 emerges. The face 51 intersects the bore 42 so that a sharp edge is formed at the intersection. The optimum angle between the conical face 51 and the axis of the bore 42 of the die 41 will depend upon the speed at which a conductor 11 is passing through the die and the particular insulating material 15 that is being applied around the conductor. Regardless of the angle of the frustoconical face 51, if a die, such as the die 41, were provided with only a face, such as the frustoconical face 51, the problems encountered as a result of drool being formed on insulated conductors are largely eliminated.

With only the frustoconical face 51 provided, a toroidal-shaped mass of plastic material similar to that shown at 155 in Fig. 4 would still adhere to the die at the exit end thereof. However, with the die 41 the material that is deposited will tend to build up slightly to the rear of the extreme exit end of the die. Consequently, the area of contact of the mass of plastic material with the covering 12 is less than when the commonly-used dies like the die 141 are employed. While the drool may cling to the covering 12, it will be held less tenaciously to the insulated covering 12 surrounding the conductor 11 than would be the case when dies of conventional design are employed. If the plastic deposits are in the form of droplets, they can be easily removed from the surface of the insulating covering 12 by passing the insulated conductor through brushes, or the like; however, such brushes may cause damage to the insulation if it is still hot and plastic from the extrusion operation. Also, if the plastic deposit is in the shape of a toroid and is around the conductor, obviously it cannot be removed without breaking either the wire or the toroid.

While the provision of a frustoconical face, such as the face 51, largely eliminates the problems caused by drool, this problem can be substantially eliminated by forming a plurality of surfaces, such as flat surfaces 52—52, in the frustoconical face 51. By forming the surfaces 52—52 substantially parallel to the frustoconical face 51, that is, along the slant height of the frustoconical face, a plurality of points 53—53 are formed at the outer extremity of the die 41. The points 53—53 are equal in number to the number of surfaces 52—52, and four of such points are shown in Fig. 3 by way of illustration.

Figure 3:
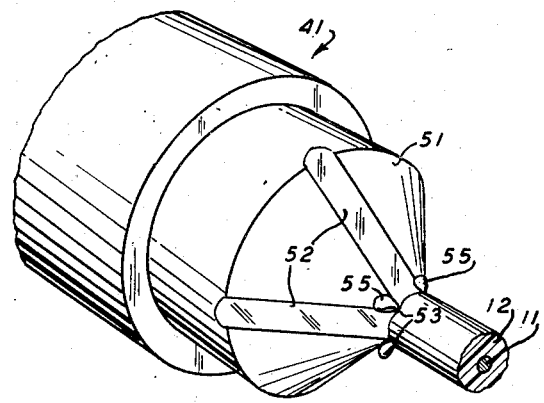
Fig. 3 is an enlarged, fragmentary, perspective view of a die forming the invention.

Any particles 55—55 of plastic material that adhere to the die 41 will build up on the points 53—53, as shown in Fig. 3, with possibly a thread-like strand of plastic material between the particles. After the particles 55—55 have increased in size sufficiently, many will break away from the die 41 and fall harmlessly from the die 41 and the insulated conductor 12. If, however, some of the particles 55—55 should adhere to the insulated conductor 12, such adherence will not be tenacious and these particles can be easily wiped from the conductor 12 by brushes, or the like.

It can be seen then that by providing a face such as the frustoconical face 51 on the die 41 forming the invention, the mass of plastic material that adheres to the die 41 will not adhere tenaciously to the covering of the conductor being insulated, but will adhere only slightly and can be removed easily. Also, by forming surfaces, such as the flat surfaces 52—52, or any other suitably-shaped surfaces that provide points at the extreme exit end of the die, any toroidal-shaped particles of plastic material that tend to form on the die 41 are broken up effectively. Therefore, no irregularities will appear in the finished, extruded product and no damage can be done by such irregularities to any apparatus that perform subsequent operations on the finished product.

In several practical embodiments of the invention, a number of dies were made each having a frustoconical face similar to the face 51 and four flat surfaces similar to the surfaces 52—52. For various speeds of the advancing conductor, it was found that an angle of approximately 40° to 50° between the conical face 51 and the axis of the bore 42 of the die was suitable. With this construction, four small particles of drool were formed. The particles broke apart readily and most of them fell harmlessly from the conductor.

It will be manifest that this invention is not limited to the specific details described in connection with the above embodiment of the invention. For example, the face 51 need not be frustoconical in configuration but may be of any suitable shape that will provide a sharp edge between that face and the bore 42 formed centrally of the die. Further, the surfaces 52—52 need not be flat, but they too may be of any suitable shape that will cause points to be formed at the extreme exit end of the die. The number of such points will depend upon the size of the die. For example, if only a small die is to be used only three points may be satisfactory, since any more would place the particles of plastic material that adhere to the points too close together when these particles increase in size, and such particles might touch each other and cling together. For larger dies, four or more of the surfaces 52—52 may be employed. Manifestly, numerous modifications may be made without departing from the spirit and scope of the invention.

What is claimed:

1. A die for forming coverings of insulating materials around conductors of indefinite length, which comprises a body member having formed therethrough a bore through which a conductor may be advanced, the body member having formed at the exit end thereof a curved face which intersects the bore at an acute angle and having a flat surface formed in the curved face so that a point is formed at each intersection of the flat surface, the face and the bore in the body member.

2. In an extruder for applying coverings of insulating materials continuously around conductors of indefinite length, a die for forming such a covering around a conductor, which comprises a body member having formed therethrough a circular bore through which the conductor may be advanced continuously, the body member having a substantially-frustoconical face formed at the end thereof from which the insulated conductor emerges and having a plurality of surfaces formed in the substantially-frustoconical face so that the boundary lines of the surfaces formed in the frustoconical face intersect the frustoconical face and the bore in the body member to define a plurality of points at the extreme exit end of the body member.

3. A die for forming coverings of insulating materials around filamentary conductors, which comprises a body member having a bore through which a conductor may be advanced continuously, the body member having a frustoconical face formed therein near the end from which the insulated conductor emerges and having a plurality of flat surfaces formed on the frustoconical face, the frustoconical face intersecting the bore in the body member to form a sharp edge therewith and adjacent boundary lines of adjacent flat surfaces intersecting to form a plurality of points at the extreme exit end of the bore in the body member where the frustoconical face and the bore intersect.

4. In an extruder for applying coverings of insulating materials continuously around conductors of indefinite length, a die for forming such a covering around a conductor, which comprises a cylindrical body member having a bore of circular cross section formed therethrough longitudinally of the body member and through which the conductor may be advanced, the body member having a frustoconical face formed on the exit end thereof from which the insulated conductor emerges, the frustoconical face intersecting the bore of the body member at the exit end thereof at an acute angle with the axis of the bore, the frustoconical face having a plurality of flat surfaces formed thereon and spaced therearound, each of the flat surfaces being substantially parallel to the frustoconical face and adjacent boundary lines of adjacent flat surfaces intersecting each other at the intersection of the frustoconical face and the cylindrical bore in the body member to form a plurality of points at the extreme exit end thereof.

5. An extruding die having a bore formed therethrough designed to form plastic material into an article, a curved outer face at the exit end thereof which intersects the bore at an acute angle, and a flat surface formed in the curved face so that a point is formed at each intersection of the flat surface, the curved face and the bore.

References Cited in the file of this patent

UNITED STATES PATENTS

| | | |
|---|---|---|
| 2,096,347 | Short | Oct. 19, 1937 |
| 2,386,818 | Seavey | Oct. 16, 1945 |
| 2,574,555 | Galloway | Nov. 13, 1951 |
| 2,628,998 | Frisbie | Feb. 17, 1953 |